United States Patent
Klumperman et al.

(10) Patent No.: US 9,700,883 B2
(45) Date of Patent: Jul. 11, 2017

(54) MODIFIED POLY (STYRENE-CO-MALEIC ANHYDRIDE) AND USES THEREOF

(75) Inventors: Lubertus Klumperman, Leiderdorp (NL); Klaus Robert Koch, Cape Town (ZA); Eugene Marlin Lakay, Stellenbosch (ZA)

(73) Assignee: STELLENBOSCH UNIVERSITY (ZA)

(*) Notice: Subject to any disclaimer, the term of this patent is extended or adjusted under 35 U.S.C. 154(b) by 832 days.

(21) Appl. No.: 13/980,710

(22) PCT Filed: Jan. 20, 2012

(86) PCT No.: PCT/IB2012/000078
§ 371 (c)(1),
(2), (4) Date: Oct. 7, 2013

(87) PCT Pub. No.: WO2012/098459
PCT Pub. Date: Jul. 26, 2012

(65) Prior Publication Data
US 2014/0023570 A1    Jan. 23, 2014

(30) Foreign Application Priority Data
Jan. 21, 2011 (ZA) .............................. 2011/00551

(51) Int. Cl.
*B01J 41/14* (2006.01)
*C08F 8/32* (2006.01)
*C22B 3/24* (2006.01)
*C22B 3/00* (2006.01)
*C22B 3/42* (2006.01)

(52) U.S. Cl.
CPC ............... *B01J 41/14* (2013.01); *C08F 8/32* (2013.01); *C22B 3/24* (2013.01); *C22B 3/42* (2013.01); *C22B 11/04* (2013.01); *Y02P 10/234* (2015.11)

(58) Field of Classification Search
CPC ... B01J 41/14; C22B 3/42; C22B 3/24; C22B 11/04; C08F 8/32; Y02P 10/234
See application file for complete search history.

(56) References Cited

U.S. PATENT DOCUMENTS 3,635,697 A * 1/1972 Scheiner ............... C01G 7/003
423/22
3,922,231 A * 11/1975 Carlin .................... C01G 55/00
205/557

(Continued)

FOREIGN PATENT DOCUMENTS

EP      1 422 248 A1    5/2004
WO      99/45039 A1     9/1999

(Continued)

OTHER PUBLICATIONS

Chinese Office Action date of mailing Sep. 12, 2014 for CN 201280005531.9 and English translation of the same (14 pages).

(Continued)

Primary Examiner — David C Mellon
(74) Attorney, Agent, or Firm — Fitch Even Tabin & Flannery LLP

(57) ABSTRACT

A polymeric compound is provided having the general formula (A) wherein R is an alkyl chain preferably having from 1 to 6 carbon atoms in the chain which may be either saturated or unsaturated and may have substituents attached to the chain, and R' and R", which may be the same or different from each other and preferably have from 1 to 4 carbon atoms in a chain, are selected from alkyl groups, substituted or unsubstituted, or R' and R" are linked to form a saturated or unsaturated cyclic moiety incorporating the adjacent nitrogen atom, with or without additional heteroatoms in the ring. The polymeric compound is preferably in a particulate form and most particularly in the form of (Continued)

nanoparticles. A method of producing the polymers is disclosed. A method of adsorbing, separating and stripping the polymers is also disclosed.

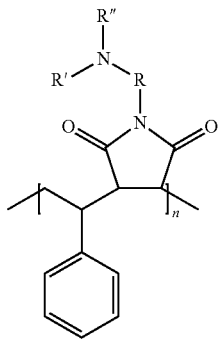

(A)

12 Claims, 5 Drawing Sheets (56) References Cited

U.S. PATENT DOCUMENTS

| 5,411,573 | A | 5/1995 | Kang et al. |
| 6,830,657 | B1 | 12/2004 | Betremieux et al. |
| 2004/0002562 | A1 | 1/2004 | Schmidhauser et al. |
| 2009/0277303 | A1 | 11/2009 | Wallace et al. |

FOREIGN PATENT DOCUMENTS

| WO | WO2004/031249 A1 | 4/2004 |
| WO | 2008/014903 A1 | 2/2008 |

OTHER PUBLICATIONS

Lee, W et al., "Polysulfonbetaines and Corresponsing Cationic Polymers. IV. Synthesis and Aqueous Solution Properties of Cationic Poly (MIQSDMAPM)", J.Appl. Poly. Sci., 1996, vol. 59, pp. 599-608, 10 pages.

Patel, C. G et al., "Chelating ion-echange properties of homopolymer and copolymers of N-(4-carboxy-5-hydroxyphenyl maleimide)", Reactive Polymers, 1993, vol. 20, pp. 123-129, 7 pages.

Alexandratos, S. D. et al., "Polymer-Supported Reagents: Application to Separation Science", Ind. Eng. Chem. Res, 1996, vol. 35, pp. 635-644, 10 pages.

Kaliyappan, T. et al., "Co-ordination polymers", Prog. Polym. Sci, 2000, vol. 25, pp. 343-370, 28 pages.

International Search Report from the International Bureau of WIPO for International Application No. PCT/IB2012/000078 dated Apr. 2, 2011 (3 pages).

Notification of Transmittal of Translation of the International Preliminary Report on Patentability (Chapter II of the Patent Cooperation Treaty) from the International Bureau of WIPO for International Application Number PCT/IB2012/000078 dated Apr. 30, 2013, 21 pages.

* cited by examiner

MODIFIED POLY (STYRENE-CO-MALEIC ANHYDRIDE) AND USES THEREOF

CROSS-REFERENCE TO RELATED APPLICATIONS

This application is a U.S. national phase application filed under 35 U.S.C. §371 of International Application PCT/IB2012/000078, filed on Jan. 20, 2012, designating the United States, which claims priority from ZA 2011/00551, filed on Jan. 21, 2011, which are hereby incorporated herein by reference in their entirety.

FIELD OF THE INVENTION

This invention relates to modified forms of poly(styrene-co-maleic anhydride).

BACKGROUND TO THE INVENTION

Poly(styrene-co-maleic anhydride) is a commercially available polymer which can be found in various grades and with maleic anhydride contents between 6 and 50% and molecular weights between 1000 and 300 000 g/mol. The high reactivity of the maleic anhydride groups in the copolymer toward nucleophilic reagents enables the manufacturing of new materials with a variety of functionalities depending on the desired application. Current uses of poly(styrene-co-maleic anhydride) derivatives include the treatment of paper, plastic, glass, nails, hair and other surfaces in order to improve the characteristics of these surfaces.

The present invention aims to provide modified forms of poly(styrene-co-maleic anhydride) which will allow it to be used in the same or other applications.

SUMMARY OF THE INVENTION

In accordance with one aspect of this invention there is provided a method of producing a polymeric compound having the general formula A (A)

wherein R is an alkyl chain which may be either saturated or unsaturated and may have substituents attached to the chain, and R' and R", which may be the same or different from each other, are selected from alkyl groups, substituted or unsubstituted, or linked to form a saturated or unsaturated cyclic moiety Incorporating the adjacent nitrogen atom, with or without additional heteroatoms in the ring the method including the steps of co-polymerising styrene and maleic anhydride to form a styrene-maleic anhydride copolymer and subjecting the copolymer to thermal imidization with a suitably substituted amine in an water to form the corresponding imide.

Further features of the invention provide for R to be a C1 to C6 alkyl chain, most preferably a propyl chain; and for R' and R" to be selected from C1 to C4 alkyl chains, preferably methyl and ethyl groups; or alternatively, for R' and R" to be linked together to form a ring containing additional nitrogen atoms.

The polymeric compound of general formula A are preferably provided in a particulate form, most preferably as nanoparticles. In the event that separation techniques may be effected or enhanced by a magnetic field, the particles may include a superparamagnetic material in which the polymeric compound preferably encapsulates the superparamagnetic material. The superparamagnetic material may be magnetite.

In accordance with a second aspect of the invention there is provided a method for the separation of ionic species constituted by, or containing one or more metals, comprising contacting a suitable polymeric compound of the formula A with a solution containing the required ionic species in order to adsorb required species onto the polymeric compound; separating the polymeric material from the solution; and treating the polymeric material in order to recover the required metal.

Further features of the second aspect of the invention provide for the polymeric material to be in particulate form, especially particles of nano size, and optionally containing particles of superparamagnetic material in order to assist in the separation of the loaded polymeric material from the solution by using a magnetic field, as may be required or appropriate; for the ionic species to be anionic metal complexes such as those of the precious metals, especially the chloride or cyanide complexes in an appropriate solution; and for the required metal to be recovered by stripping the polymeric material with a suitable stripping agent selected from nitric acid, hydrochloric acid, sulphuric acid, and acidified thiourea, and especially concentrated nitric acid having a concentration of from 5 to 10 Molar $HNO_3$.

The invention will be further described below with reference to the accompanying drawings and with particular reference to an application to the separation of precious metals in which the invention has been tested to an appreciable extent.

DETAILED DESCRIPTION WITH REFERENCE TO THE DRAWINGS

In one embodiment of the invention a polymeric compound having the general formula A

(A)

was produced in which R was propyl and R' and R" were methyl and ethyl groups.

The compound was obtained by the thermal imidization of the poly(styrene-co-maleic anhydride) copolymer in a double walled oil heated autoclave equipped with a mechanical agitator to produce the corresponding poly(styrene-co-maleimide). In particular, the poly(styrene-co-maleimide) was synthesized by the chemical modification of polystyrene-co-maleic anhydride with dimethylamino-propylamine. The imidization reaction typically yielded white stable dispersions containing poly(styrene-co-maleimide) nanoparticles of 46±4.9 nm, with the particle size depending on the agitation rate employed. Typical reaction conditions were 150°-180° C. at a pressure of 5-7 bars for 6 hours.

Figure 1:
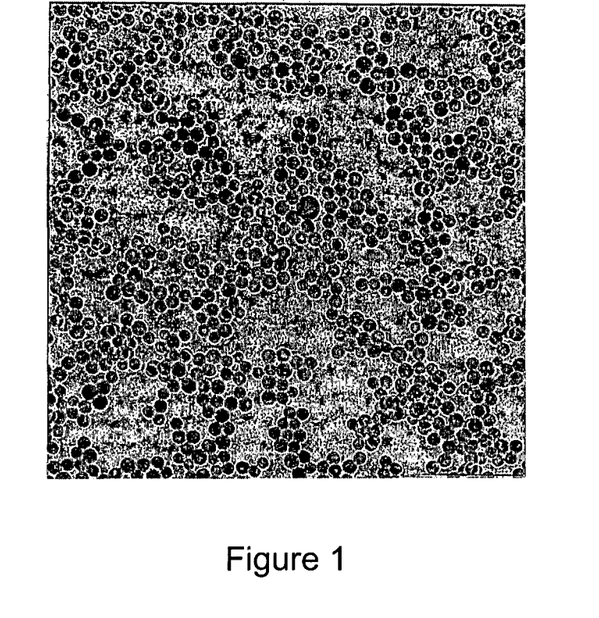
FIG. 1 is a transmission electron microscopy (TEM) image of one embodiment of poly(styrene-co-maleimide) nanoparticles according to the invention.
Figure 2:
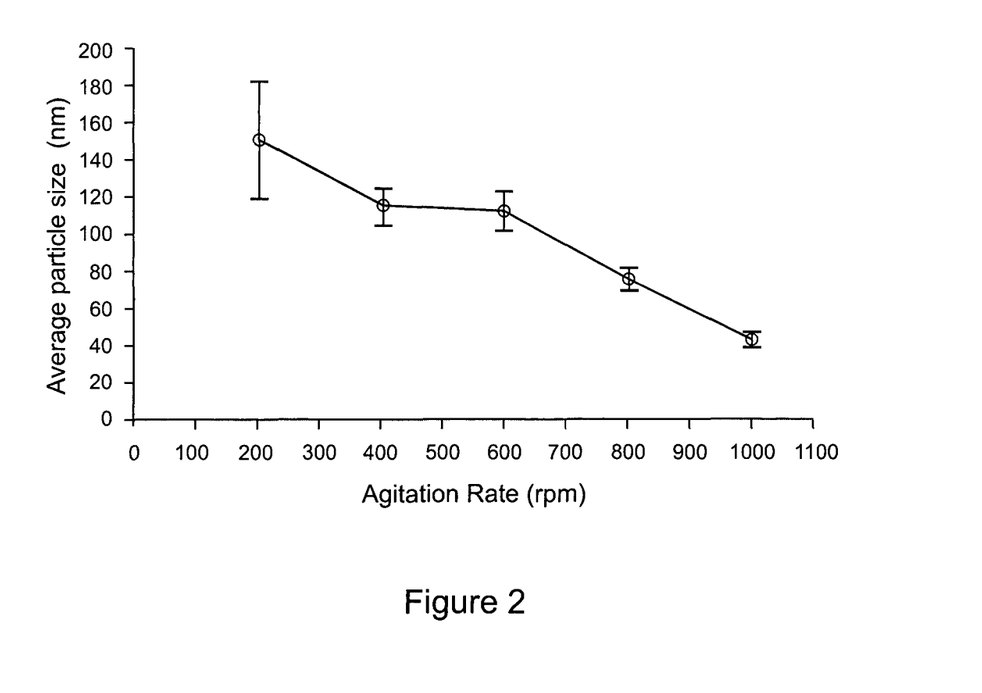
FIG. 2 is a plot showing poly(styrene-co-maleimide) nanoparticle size as a function of agitation rate in a reaction vessel in the form of a double walled oil heated autoclave equipped with a mechanical agitator.

The general reaction equation illustrating the amidation and cyclization during imidization is as follows:

Imidization of poly(styrene-co-maleic anhydride) with 3-dimethylamino-propylamine (1:1) resulted in stable dispersions containing well disseminated, nano-sized poly(styrene-co-maleimide) particles of size ranging from about 150 nm at slow agitation rates of about 200 rpm to about 50 nm at higher agitation rates of about 1000 rpm. FIG. 1 shows the transmission electron microscopy (TEM) image of a product that had a particle size of 77.4±6.08 nm. The variation of sizes of the spherical particles that are dependent on the agitation rate is illustrated in the plot in FIG. 2. It will be noted that the poly(styrene-co-maleimide) nanoparticle sizes increased considerably with decreasing agitation rate during the synthesis. Nanoparticles are preferred as these provide a high surface area to mass ratio and hence greater extraction efficiency than larger particles.

The poly(styrene-co-maleimide) copolymer was isolated from the dispersion using freeze drying/vacuum oven drying techniques to yield a fine white powder material.

The resultant matrix of styrene maleimide copolymer had tertiary amine functional groups. It had anionic form with H$^+$ and the powder that had a particle size of about 50 nm had a total exchange capacity of 4.30±0.40 mmol/g. The BET specific surface area of the same powder was 60±2.20 m$^2$/g; the average pore diameter (BET) was 86.94 angstroms; and the BJH pore volume was 0.1299 cm$^3$/g.

Figure 3:
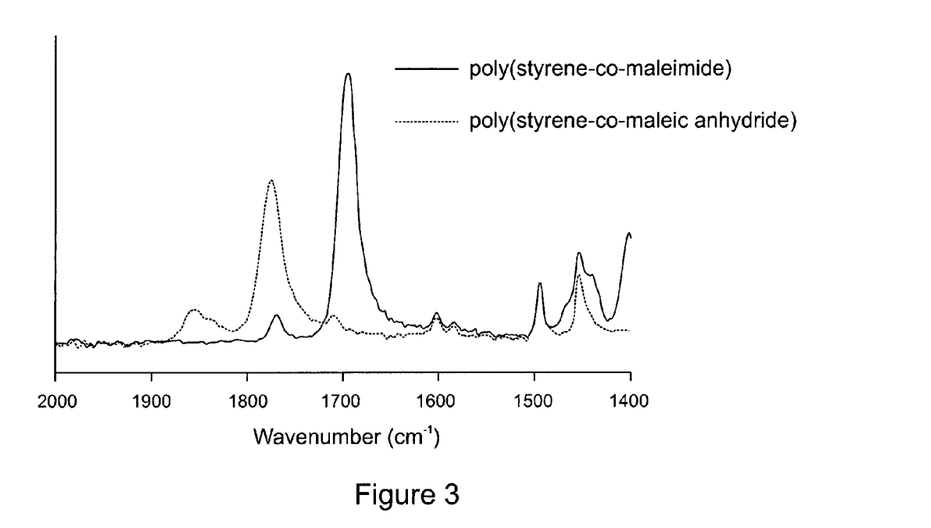
FIG. 3 is an FTIR (ATR) spectrum of the poly(styrene-co-maleimide) copolymer (solid line) and the parent poly(styrene-co-maleic anhydride) copolymer (broken line).

As shown in FIG. 3, the characteristic vibrational doublet peaks of anhydride units of poly(styrene-co-maleic anhydride) appear at 1780 and 1850 cm$^{-1}$. However, after reaction with 3-dimethylamino-propylamine a new intense, broad peak corresponding to the imide functionality appeared at 1690 and 1770 cm$^{-1}$. No significant doublet peaks could any longer be observed at 1780 and 1850 cm$^{-1}$ after amine modification, illustrating successful and complete conversion of poly(styrene-co-maleic anhydride) into the poly(styrene-co-maleimide) derivative. It should be noted that complete imidization was achieved in all cases.

Depending on reaction media and processes, it may be advantageous to make the particles of poly(styrene-co-maleimide) susceptible to a magnetic field and in that instance it is possible to envelop magnetite nanoparticles within the polymer. The magnetite may be prepared by a known process from FeCl$_2$ and FeCl$_3$ in aqueous ammonia solution. Excess ammonia is then removed and the magnetite dispersion may be mixed with a solution of a copolymer of styrene and the amic-acid of maleic anhydride and an aliphatic amine. Heating may be used to lead to the formation of poly(styrene-co-maleimide). This is insoluble in water and spontaneously forms nanoparticles that entrap the magnetite.

The nanoparticles so created have the advantage that they can be manipulated by a magnetic field. For instance, the poly(styrene-co-maleimide) can be removed from a suspension by simply applying a suitable magnetic field to the suspension. This can be useful where it is desired to separate the poly(styrene-co-maleimide) particles from a suspension after an adsorption activity.

Two alternatives are envisaged for preparing particulate material including the polymeric compound and superparamagnetic material. One method is for poly(styrene-co-maleic anhydride) to first be reacted with the functionalised amine to form the poly(styrene-co-maleimide) copolymer that is then reacted with the magnetite dispersion after the removal of the ammonia. The other method is for the entire process to be done in ammonia to form an unsubstituted maleimide, which readily reacts with formaldehyde and then subsequently reacts with primary amines in a process resembling the formation of melamine-formaldehyde polymerisation.

Figure 4:
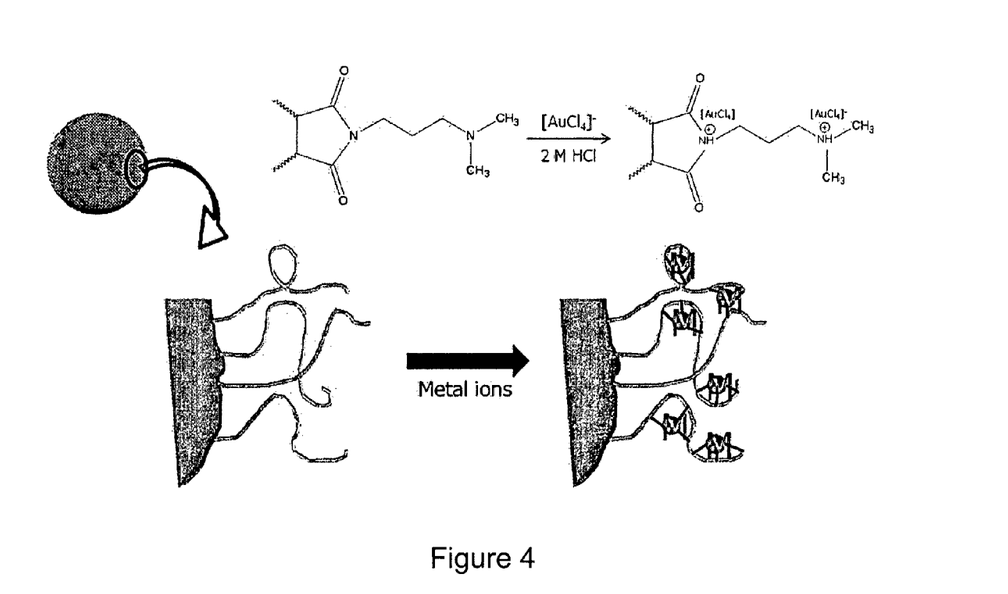
FIG. 4 is a sketch depicting the extraction principle, illustrating electrostatic interaction/ion-pairing of gold chloride with the protonated amino sites of the amine-functionalized poly(styrene-co-maleimide) copolymer. M denotes complex $[AuCl_4]^-$ anions located at the protonated sites on the polymer chains.

Reverting now to the poly(styrene-co-maleimide) itself that was produced in the manner described above, it has been found that this polymer is particularly useful for the extraction of anionic gold chloride from an aqueous acidic solution. In hydrochloric acid solutions, the amine moieties in the backbone of the polymer are sufficiently protonated, which enables interaction with negatively charged species in solution. This process is illustrated in FIG. 4 and a simplified representation of the mechanism of extraction is also shown.

The solid phase, poly(styrene-co-maleimide) copolymer material, was contacted with 10 ml (a quantity that was used in all case unless otherwise stated) of an aqueous phase, standard gold chloride solution in 2 M HCl, using a batch sorption technique. The solid phase was then separated from the aqueous phase using, in this instance, centrifugation and subsequently decantation. The supernatant was collected and analyzed for metal content using inductively coupled plasma—optical emission spectroscopy and mass balancing. It should be noted that gold is extracted as the anionic species, $[AuCl_4]^-$, as illustrated by the mechanism illustrated in FIG. 4. The poly(styrene-co-maleimide) copolymer before extraction had a white colour and after extraction, a deep yellow colour indicative of gold adsorption.

It has also been found that the polymer described above is useful for absorbing other anionic precious metal complexes from solutions. All of the extraction processes include the steps of: contacting a metal ion-containing solution with the adsorbent material using a batch sorption technique; separating the loaded adsorbent from the solution; and recovering the adsorbed metal from the adsorbent material.

A series of extraction/adsorption tests were conducted to obtain information with regard to the extraction efficiency, stripping and recovery of anionic precious metal complexes. Factors generally affecting extraction are particle Size, surface area, pore structure, ligand concentration, acidity, and the nature of the metal species to be adsorbed. Usually, adsorption equilibria and rate of adsorption must be considered for effective applications in extraction.

In order to determine the quantity of adsorbent needed for maximum loading capacity, the extraction of $[AuCl_4]^-$ by the poly(styrene-co-maleimide) produced as described above was investigated as a function of poly(styrene-co-maleimide) dosage. A contact time of 24 h was used to ensure that equilibrium adsorption had been reached and a synthetic feed solution containing 450 mg/l $[AuCl_4]^-$ was used. The results are shown in FIG. 5 and indicate, as expected, that the adsorption of $[AuCl_4]^-$ is dependent on the mass of adsorbent.

Figure 5:
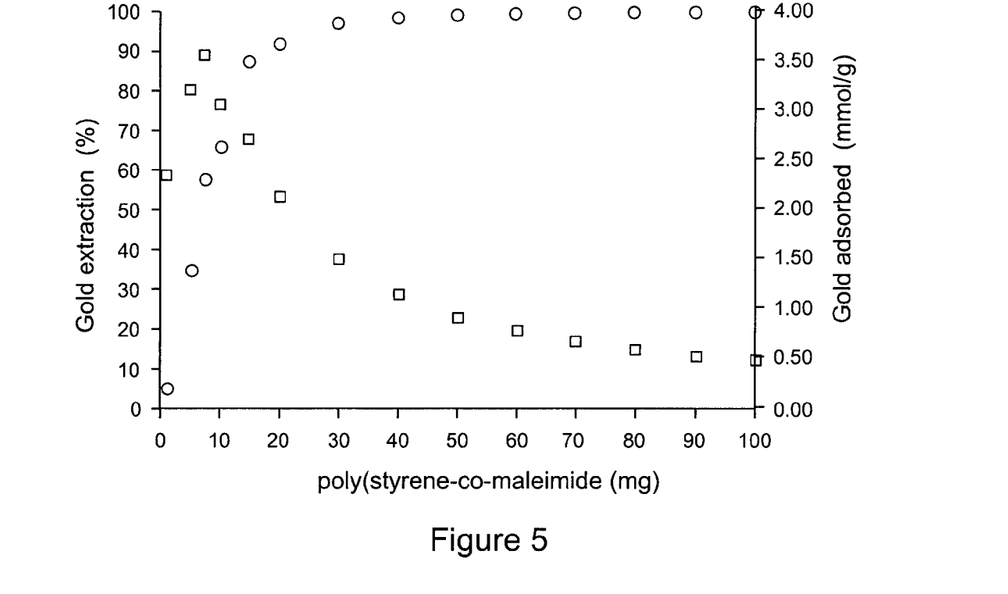
FIG. 5 shows gold [AuCl$_4$]$^-$ extraction (batch sorption) from a 2 M HCl solution for a particular set of conditions set our hereinafter.

As can be seen from FIG. 5, the extraction of $[AuCl_4]^-$ proliferate systematically with an increase in the adsorbent dosage. The adsorption density increases using poly(styrene-co-maleimide) dosages between 1-7.5 mg. Further increases in the adsorbent dosage, however, resulted in a decrease in adsorption density. This suggests that under the experimental conditions for the $[AuCl_4]^-$ concentration used, 7.5 mg dosages are adequate for complete saturation of all the available amine sites on the adsorbent. This amounts to approximately 57.6% extraction of the initial $[AuCl_4]^-$ in the synthetic feed solution. The decrease in adsorption density can be attributed to the fact that more adsorption sites remain unsaturated upon raising the adsorbent dosages from 7.5-100 mg. It is evident that 50 mg of poly(styrene-co-maleimide) extract 99.2% (0.992 mmol/g) of the $[AuCl_4]^-$ ions initially present in the synthetic feed solution. For dosages exceeding 50 mg, no significant increase in the extraction efficiency was observed. A maximum amount of 99.6% of $[AuCl_4]^-$ was extracted from the solution using 100 mg poly(styrene-co-maleimide) adsorbent dosages. From this data it would seem that 50 mg of adsorbent would suffice for almost quantitative extraction of $[AuCl_4]^-$ from solution.

Figure 6:
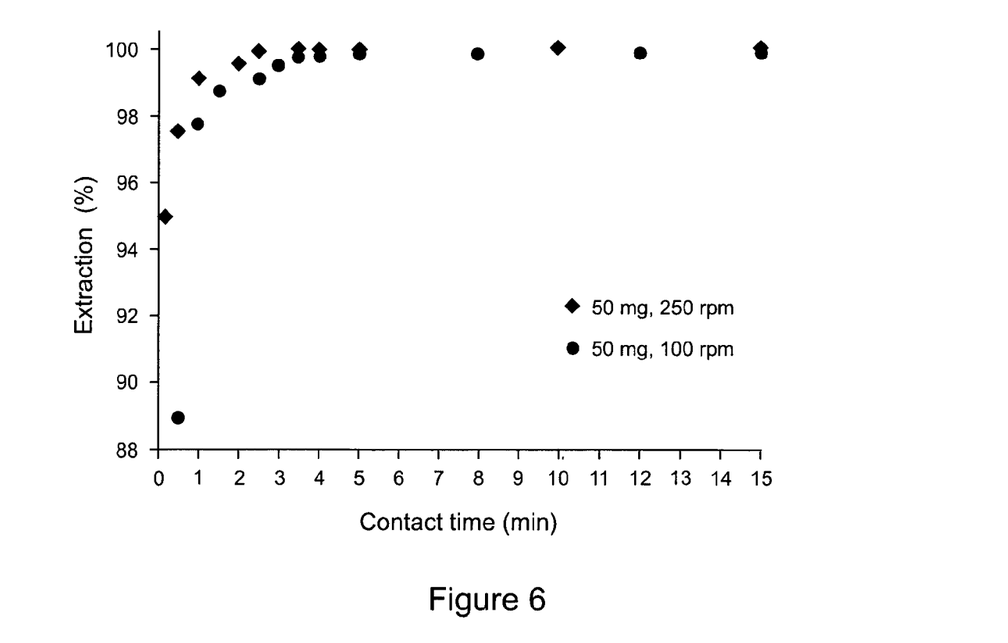
FIG. 6 illustrates graphically the effect of contact time on the extraction of [AuCl$_4$]$^-$ from 2 HCl at 100 rpm and 250 rpm with other experimental conditions as stated below.

The effect of contact time (at different agitation rates) on the extraction of $[AuCl_4]^-$ from solution was investigated to determine the optimum time required for subsequent experiments. Agitation rates of 100 and 250 rpm were used during batch sorption with poly(styrene-co-maleimide) dosages of 10±0.1 and 50±0.2 mg, respectively. Poly(styrene-co-maleimide) was contacted with a solution containing 450 mg/L $[AuCl_4]^-$ for periods of between 0.5 and 15 min at a temperature of 23±1.0° C. FIG. 6 shows that the extraction kinetics is extremely fast and to some extent dependant on the rate of agitation. The data indicates that using an agitation rate of 100 rpm, an increase in the extraction efficiency from 88-99.8% takes place over the time as from 0.5 minutes. In comparison, at an agitation rate of 250 rpm, the extraction of $[AuCl_4]^-$ is slightly faster showing an enhanced extraction efficiency of 97.53-99.8% for the same time period.

It is believed that the extremely fast kinetics of extraction can be attributed to:
 (i) the rate of collision between the adsorbent material and the metal species in the aqueous phase;
 (ii) the size of the adsorbent material—the smaller the particle size of the adsorbent material, the better the access to the surface area and the faster the rate of extraction kinetics;
 (iii) porosity—(based on electron microscopy (results not shown here), it was found that individual particles densely aggregate to form a film-like structured material to almost form flat surfaces. However the convoluted material displays clear evidence of elongated strands of mesoporosity (pore sizes of about 86 angstroms). These pores provide superb conditions for adsorption to occur, since adsorbate can interact with many surfaces simultaneously.);
 (iv) the nature of interaction between the adsorbent and the adsorbate—the exact nature of the interaction depends on the details of the species involved, but the adsorption process is expected to occur due to electrostatic attraction.

FIG. 6 shows no significant change in extraction efficiency with increasing contact time beyond 5 min, indicating that a short exposure time of only 15 min is sufficient for adsorption equilibrium. That time period was therefore used during the rest of the experimental work unless otherwise stated.

Figure 7:
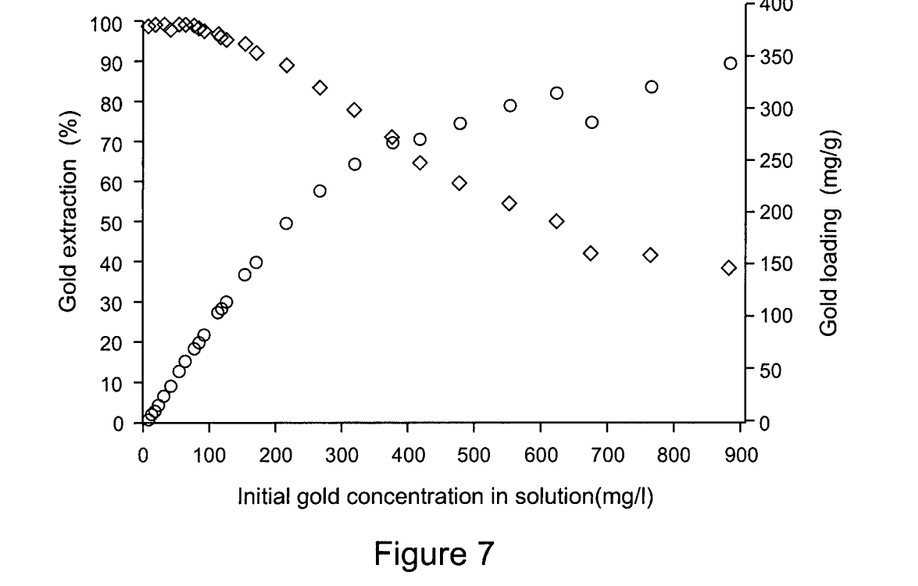
FIG. 7 illustrates graphically the relationship between the equilibrium [AuCl$_4$]$^-$ concentration initially present in aqueous phases and the equilibrium loading capacity for the same system.

The effect of initial metal ion concentration on the adsorption of $[AuCl_4]^-$ by poly(styrene-co-maleimide) was investigated in order to establish the equilibrium loading capacity of the adsorbent. Studies were carried out using varying initial $[AuCl_4]^-$ concentrations from 1-935 mg/L and poly(styrene-co-maleimide) dosages of 10 mg. FIG. 7 illustrates the relationship between the equilibrium $[AuCl_4]^-$ concentration initially present in the aqueous phase and the equilibrium loading capacity. As can be seen, the results demonstrate that the amount of $[AuCl_4]^-$ adsorbed increases with increasing initial $[AuCl_4]^-$ concentration. The adsorption isotherms of $[AuCl_4]^-$ by poly(styrene-co-maleimide) therefore resemble a Langmuir-type curve. From 1 mg/l to about 80 mg/l, quantitative extraction was observed. This indicates that in that concentration range, 10 mg dosages of poly(styrene-co-maleimide) would suffice for extraction of $[AuCl_4]^-$ quantitatively from solution. It is noticeable from the experimental data that saturation has not been completely reached indicating that excess available amine sites are present. From the result, the maximum adsorption capacity was found to be 343.9 mg/g or 1.746 mmol/g (amount of $[AuCl_4]^-$ adsorbed per gram of dry adsorbent). It should be noted that the equilibrium adsorption data point at 674 mg/l is an outlier and this discrepancy may be attributed to experimental error.

Figure 8:
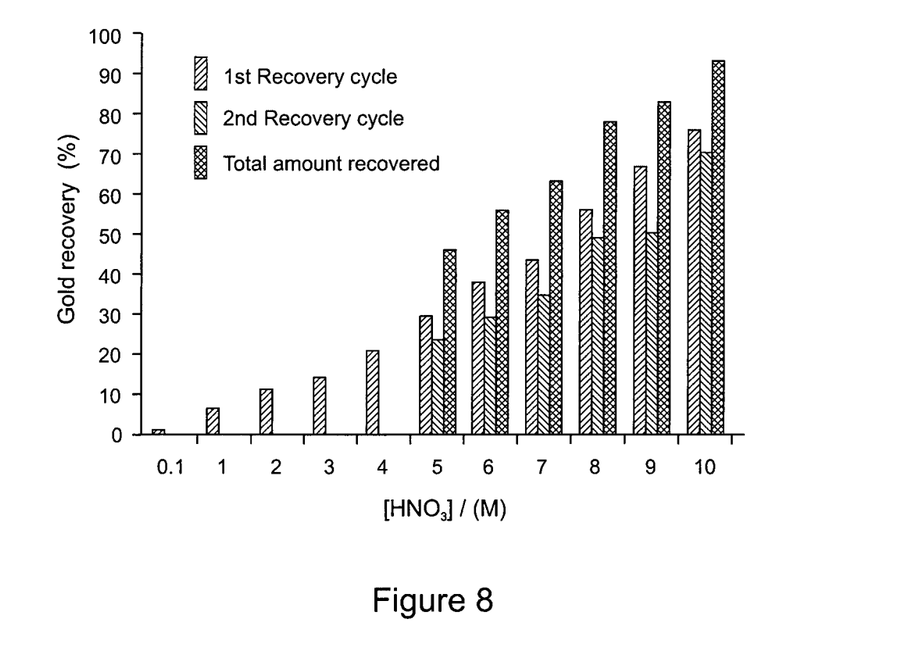
FIG. 8 illustrates in bar graph format the efficacy of stripping the adsorbed gold from the polymer for different strengths of nitric acid as the stripping agent.

To elute the adsorbed $[AuCl_4]^-$ retained on the poly(styrene-co-maleimide) material after extraction, $HNO_3$ solutions of various concentrations were tested as eluants. It should be noted that for these experiments, samples containing practically quantitatively adsorbed $[AuCl_4]^-$ of greater than 99% were used. Represented in FIG. 8 are the $[AuCl_4]^-$ recovery profiles as a function of $HNO_3$ concentrations in the range 0.1-10 M. The recovery efficiency using less than 4 M $HNO_3$ was almost inconsequential, as illustrated by the 1st recovery cycle. For that reason, only one recovery cycle was done in the 0.1-4 M range whilst two successive recovery cycles were employed for 5-10 M $HNO_3$ solutions. Also shown in FIG. 8 is the total amount of $[AuCl_4]^-$ recovered for the two successive recovery cycles for the 5-10 M $HNO_3$. As can be seen, there is a steady increase in the recovery reaching a maximum of about 93% using 10 M $HNO_3$.

From FIG. 8, it is apparent that with an increase in $HNO_3$ concentration, the amount of $[AuCl_4]^-$ recovered increases. At the lower limit of the profile between 0.1 M and 4 M $HNO_3$, only about 1.2 to 21.5% of the adsorbed $[AuCl_4]^-$ could be recovered from the adsorbent in one strip cycle. The 5 to 10 M $HNO_3$ solutions showed a considerable rise in the $[AuCl_4]^-$ recovery reaching a maximum of 76.5% for the first recovery cycle. Conducting a second stripping cycle (from 5 to 10 M $HNO_3$), additional $[AuCl_4]^-$ that remained adsorbed after the first strip cycle was recovered, although this amounts to less $[AuCl_4]^-$ recovered than in the first stripping cycle.

The results are also summarized in Table 1 below.

TABLE 1

| $HNO_3$ (mol/l) | $1^{st}$ Cycle | $2^{nd}$ cycle | Efficiency | Total Recovered |
|---|---|---|---|---|
| 0.1 | 1.17 | — | — | 1.17 |
| 1 | 6.87 | — | — | 6.87 |
| 2 | 11.73 | — | — | 11.73 |

TABLE 1-continued

| $HNO_3$ (mol/l) | $1^{st}$ Cycle | $2^{nd}$ cycle | Efficiency | Total Recovered |
|---|---|---|---|---|
| 3 | 14.49 | — | — | 14.49 |
| 4 | 21.48 | — | — | 21.48 |
| 5 | 29.63 | 24.17 | 81.55 | 46.64 |
| 6 | 38.58 | 29.19 | 75.68 | 56.51 |
| 7 | 43.91 | 35.07 | 79.87 | 63.59 |
| 8 | 56.57 | 49.64 | 87.75 | 78.13 |
| 9 | 66.68 | 50.79 | 76.17 | 83.61 |
| 10 | 76.53 | 70.92 | 92.66 | 93.18 |

A mass balance was carried out using a mixture of 10% $HNO_3$/1% HCl and microwave digestion for 30 min at a temperature of 230° C. and pressure 41.37 bar (600 psi). Digestion of the $[AuCl_4]^-$ adsorbed poly(styrene-co-maleimide) material under similar conditions to those mentioned above followed by addition of deionized $H_2O$, resulted in the precipitation of highly pure gold powder. The morphology of the gold precipitate was investigated with scanning electron microscopy and was found to be of a thin flake-like structure. The crystallinity and phase purity was verified by powder x-ray diffraction.

Figure 9:
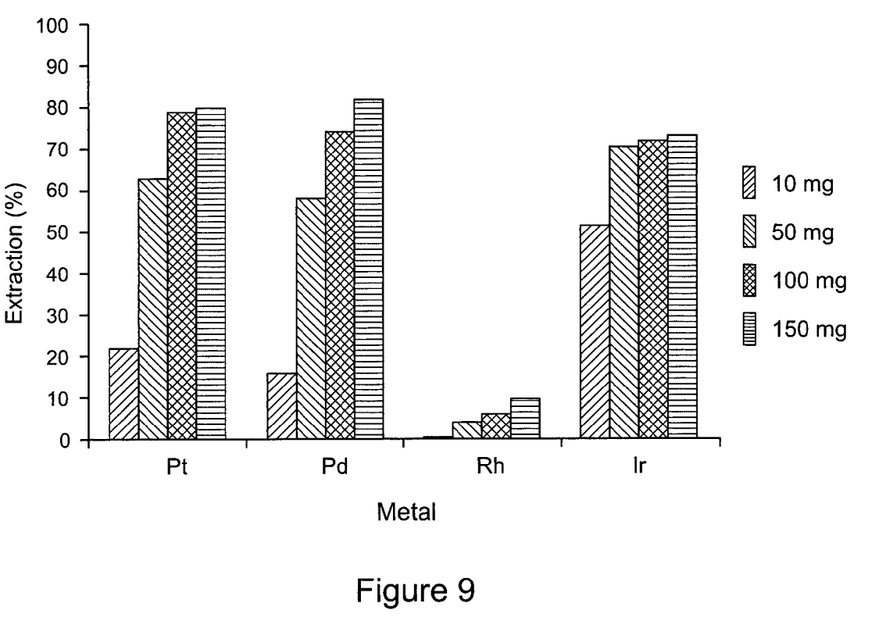
FIG. 9 illustrates in bar graph format the loading of selected platinum group metals onto the polymer being tested; and, FIG. 10 illustrates in bar graph format the loading of gold selectively from a mixture of precious metals.

The extraction behavior of poly(styrene-co-maleimide) for precious metal complexes more generally, namely $[AuCl_4]^-$, $[PdCl_4]^{2-}$, $[IrCl_6]^{2-}$, $[PtCl_6]^{2-}$ and $[RhCl_6]^{3-}$ as a function of adsorbent dosage was also investigated and the results are shown in FIG. 9. The results clearly indicate that the extraction is dependent on the poly(styrene-co-maleimide) dosage. The dosages used were 10, 50, 100, and 150 mg of poly(styrene-co-maleimide).

In general the order of selectivity for the extraction was found to be $[IrCl_6]^{2-} > [PtCl_6]^{2-} \approx [PdCl_4]^{2-} > [RhCl_6]^{3-}$ for the 10 and 50 mg poly(styrene-co-maleimide) dosages. In the case of the 100 and 150 mg dosages the selectivity is more or less in the order $[PdCl_4]^{2-} \approx [PtCl_6]^{2-} > [IrCl_6]^{2-} > [RhCl_6]^3$, respectively. The "extractability" of these metals can be related to the size and charge of the complex anions.

Figure 10:
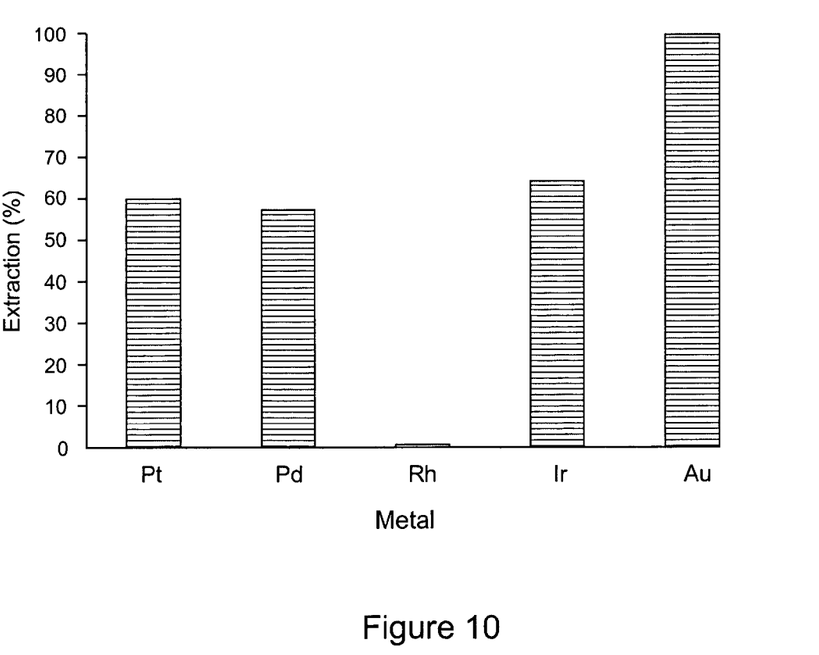

The excellent selectivity of $[AuCl_4]^-$ above the other anionic PGM chloro-complexes is illustrated by the results shown in FIG. 10. The extraction profiles shown of the precious metals were of tests in which 50 mg poly(styrene-co-maleimide) adsorbent dosages were employed. From FIG. 10, it can be deduced that no significant decrease in the PGM extraction efficiency was observed in the presence or absence of $[AuCl_4]^-$ in the multi-element solution. However, $[AuCl_4]^-$ was quantitatively extracted as was found previously, even in a competitive extraction environment. In this case the order of "extractability" was found to be $[AuCl_4]^- > [IrCl_6]^{2-} > [PtCl_6]^{2-} > [PdCl_4]^{2-} > [RhCl_6]^{3-}$. It would seem as if the poly(styrene-co-maleimide) adsorbent is very selective and has a high affinity for $[AuCl_4]^-$ over PGMs and is also selective for $[IrCl_6]^{2-}$, $[PtCl_6]^{2-}$ and $[PdCl_4]^{2-}$ over $[RhCl_6]^{3-}$. It is believed that the reason for the latter observation can be attributed to the fact that $[RhCl_6]^{3-}$ complexes hydrate extensively to form $[RhCl_{6-n}(H_2O)_n]^{3-n}$ species (with n=0, 1, 2 and 3), even under the acidic conditions used in extraction experiments.

It will be appreciated that the polymeric compounds of formula A may be useful in extracting many other metals or metal compounds, including metal complexes, from solution, particularly those having an anionic form. The polymeric compounds may have many different forms, particularly as regards the identity of R, R' and R". For example these may include further amine groups or other metal ligands such as triazoles and imidazoles, and these could be tethered to the polymer via an aminoalkyl-linker. The high reactivity of the maleic anhydride groups in the co-polymer toward nucleophilic reagents enables the manufacturing of materials with a variety of functionalities depending on the desired application.

The polymeric compounds of the invention are relatively simple to produce and offer very high efficiency in extracting gold and other metals from solution. The inclusion of superparamagnetic material in particles of the polymeric compound, preferably through encapsulation, can be used to enable these to be easily separated out of suspensions with a high degree of efficiency.

It will be appreciated therefore that many other embodiments exist which fall within the scope of the invention.

The invention claimed is:

1. A method for the separation of ionic species constituted by, or containing, one or more metals, comprising contacting a particulate form of a polymeric compound of general formula A:—

(A)

wherein R is an alkyl chain which is either saturated or unsaturated and is either substituted or unsubstituted, and R' and R", which are the same or different from each other, are alkyl groups, substituted or unsubstituted, or linked to form a saturated or unsaturated cyclic moiety incorporating an adjacent nitrogen atom, with or without additional heteroatoms in the ring, and wherein $5<n<1500$, with a solution containing the ionic species in order to adsorb the ionic species onto the polymeric compound of general formula (A); separating the polymeric compound of general formula (A) with the ionic species adsorbed thereto from the solution; and treating the polymeric compound of general formula (A) with the ionic species adsorbed thereto in order to recover said one or more metals.

2. A method as claimed in claim 1 in which the ionic species are anionic metal complexes.

3. A method as claimed in claim 1 in which the ionic species are ionic metal complexes of one or more precious metals selected from the group consisting of gold, platinum, palladium, rhodium and iridium.

4. A method as claimed in claim 3 in which the ionic metal complexes are chloride or cyanide complexes.

5. A method as claimed in claim 1 in which the metal is recovered by stripping the polymeric compound of general formula A with the ionic species adsorbed thereto with a stripping agent selected from the group consisting of nitric acid, hydrochloric acid, sulphuric acid, and acidified thiourea.

6. A method as claimed in claim 5 in which stripping is effected using concentrated nitric acid having a concentration of from 5 to 10 Molar.

7. A method as claimed in claim 3 in which the ionic species is an ionic metal complex of gold.

8. A method as claimed in claim 1 in which R is a C1 to C6 alkyl chain and R' and R" are C1 to C4 alkyl chains or a ring linking R' and R" and containing at least one additional nitrogen atom.

9. A method as claimed in claim 8 in which R is a propyl chain and R' and R" are methyl or ethyl groups.

10. A method as claimed in claim 1 in which the polymeric compound of general formula A is in the form of nanoparticles.

11. A method as claimed in claim 1 in which particles of the polymeric compound of general formula A include a superparamagnetic material.

12. A method as claimed in claim 11 in which the superparamagnetic material is magnetite.

* * * * *